Dec. 30, 1969    KOICHI KOBAYASHI    3,486,805
ULTRA-ACHROMATIC FLUORITE SILICA TRIPLET LENS SYSTEM
Filed Feb. 9, 1966
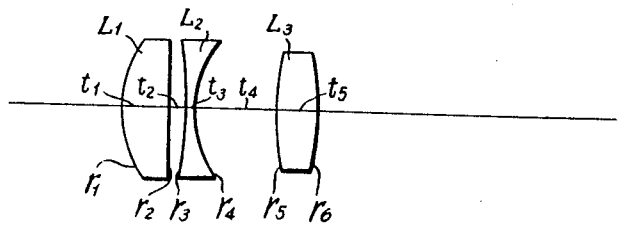
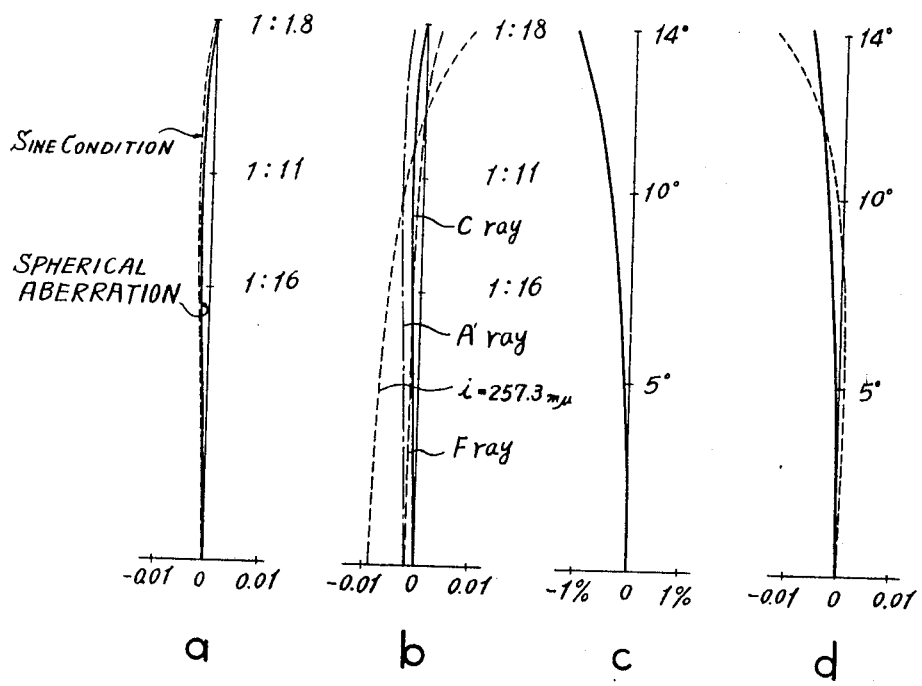
INVENTOR.
KOICHI KOBAYASHI
BY Stanley Wolder

United States Patent Office

3,486,805
Patented Dec. 30, 1969

3,486,805
ULTRA-ACHROMATIC FLUORITE SILICA TRIPLET LENS SYSTEM
Koichi Kobayashi, Tokyo-to, Japan, assignor to Ashi Kogaku Kogyo Kabushiki Kaisha, Tokyo-to, Japan, a corporation of Japan
Filed Feb. 9, 1966, Ser. No. 526,083
Claims priority, application Japan, Feb. 20, 1965, 40/9,398
Int. Cl. G02b $3/00, 1/00, 9/14$
U.S. Cl. 350—2     2 Claims

ABSTRACT OF THE DISCLOSURE

A triplet lens system of focal length F includes first and third positive fluorite lenses and a second negative fused silica lens and possesses the following parameters $1/F_1 > 2.5/F$
$0 > 1/F_{1,2} > -1.2/F$
$0.08F < r_4 < 0.25F$
$r_5 < 0.5F$
$t_2 < 0.065F$ wherein $F_1 \ldots _1$ are the resultant focal lengths of the subscript designated lenses, $r_4$ and $r_5$ are the fourth and fifth lens face radii of curvature and $t_2$ is the distance between the first and second lenses.

---

The present invention relates to improved photographic lens system which is well corrected for chromatic aberration with respect to light rays of wide wave length range.

Generally, the conventional photographic lens systems are of poor transmittivity with respect to light rays of shorter wave length range. In recently produced lens systems comprising increased number of lenses for enlarging the relative aperture or made of optical glasses containing such rare elements as lanthanum or tellurium, light rays of shorter wave length range are greatly absorbed and hardly reaches the film. Thus, although the film is sensitive to such shorter wave length light rays, the lens system prevents such light rays from reaching the film. Accordingly, such nature of the conventional lens systems is contrary to the object of obtaining brighter lens systems by increasing the relative aperture. Accordingly, a remarkable improvement would be achieved if shorter wave length light absorption by the lens system is decreased and corresponding light rays can excite the film. This, however, would present a difficulty in making corrections of chromatic aberration with respect to light rays ranging from very short to very long wave lengths. Correction over such wide range cannot be carried out by conventional achromat lenses corrected for chromatic aberration with respect to two monochromatic light rays or by apochromat lenses corrected for chromatic aberration with respect to three monochromatic light rays.

It is therefore a principal object of the present invention to provide a photographic lens system corrected for chromatic aberration with respect to light rays ranging from very short to very long wave lengths.

Another object of the present invention is to provide a photographic lens system which is very effectively corrected for chromatic aberration with respect to light rays having wave length range of from 200 to 800 m$\mu$.

Still another object of the present invention is to provide a photographic lens system which enables the hitherto absorbed light rays to reach the film and excite same so as to heighten the film exciting efficiency.

A further object of the present invention is to provide a photographic lens system having ordinary image angle, removing the drawback of narrow image angle of the conventional lens systems.

The above and other objects of the present invention will become apparent from a reading of the following description taken in conjunction with the accompanying drawing wherein:

FIGURE 1 is a longitudinal sectional view of the lens system embodying the present invention; and FIGURE 2 is a group of curves illustrating the abberation characteristics of the lens system of the present invention, (a) indicating spherical aberration (solid line) and sine condition (dotted line), (b) chromatic differences of spherical aberrations, (c) distortion and (d) astigmatism.

In the present invention, the above mentioned objects have been attained by employing novel optical materials for lenses and introducing a novel optical design which makes right use of the specific character of such novel optical materials, the novel optical design being made with respect to lens arrangement, relative relation among focal lengths, lens face curvatures, lens thicknesses, etc.

In lens systems transmitting light rays of wide wave length range fluorite and fused silica are utilized for making the lenses. Due to low refractive indices of the optical materials, however, the Petzval sum of such lens systems is apt to be large so that such lens system is not fit for practical use for photographic purposes, though it can be used for narrow-field optical instruments such as spectroscope.

Referring now to FIGURE 1, the lens system according to the present invention is of triplet type comprising the first lens $L_1$ which is positive, the second lens $L_2$ which is negative, and the third lens $L_3$ which is positive. The positive lenses are made of fluorite and the negative lens is made of fused silica. This lens system satisfies the following condition:

$1/F_1 > 2.5/F$
$0 > 1/F_{1,2} > -1.2/F$
$0.08F < r_4 < 0.25F$
$r_5 < 0.5F$
$t_2 < 0.065F$ wherein F is the resultant focal length of the whole lens system, $F_1$ is the focal length of the first lens $L_1$; $F_{1,2}$ is the resultant focal length of the first and the second lenses $L_1$ and $L_2$; $r_i$ is the radius of curvature of the $i$th refractive surface; and $t_i$ is the distance between the $i$th and the $(i+1)$th refractive surfaces.

In lens systems of this kind, for making the Petzval sum small, the power of each component lens must be of large value. Accordingly, in the present invention the power of the first lens $L_1$ is made to be larger than 2.5 times the resultant power of the whole lens system, consideration being also given to correction of chromatic aberration. Considering aggravation of coma aberration by the second lens $L_2$ which is required to be of large minus power, the absolute value of the resultant minus power of the first and the second lenses $L_1$ and $L_2$ is held down to less than 1.2 times the resultant power of the whole lens system. The radius of curvature $r_4$ of the fourth refractive surface is made to be larger than 0.08 times, and less than 0.25 times, the whole resultant focal length F. Unlike the conventional triplet lenses, in order to correct the excessive correction of astigmatism due to the last mentioned design, the radius of curvature $r_5$ of the fifth refractive surface is made to be less than 0.5 times the whole resultant focal length F. For correcting chromatic aberration, it is very effective to make the distance between the first and second lenses $L_1$ and $L_2$ to be less than 0.065 times the whole resultant focal length F.

The above mentioned conditions being satisfied, a triplet type lens system is obtained which produces an even image plane and which is excellently corrected for every aberration with respect to light rays of wave lengths ranging from ultraviolet to infrared parts.

One example of the present invention is as follows:

[*f*=1.0; Relative aperture, 1:8]

| | | |
|---|---|---|
| $r_1=0.11347$ | $t_1=0.04409$ | $N_e=1.43248$  $\nu=95.2$ |
| $r_2=1.9693$ | $t_2=0.01455$ | |
| $r_3=-0.53803$ | $t_3=0.00826$ | $N_e=1.45642$  $\nu=68.0$ |
| $r_4=0.1032$ | $t_4=0.07783$ | |
| $r_5=0.274$ | $t_5=0.0324$ | $N_e=1.43248$  $\nu=95.2$ |
| $r_6=-1.163665$ | | |

The table of Seidel's aberration coefficient in connection with the above lens system is as follows:

| | $S_1$ | $S_2$ | $S_3$ | P | $S_5$ |
|---|---|---|---|---|---|
| 1 | 144.260 | 16.369 | 1.857 | 2.660 | 0.512 |
| 2 | 15.605 | −5.034 | 1.624 | −0.153 | −0.474 |
| 3 | −49.691 | 8.865 | −1.584 | −0.582 | 0.387 |
| 4 | −122.901 | −25.391 | −5.245 | −3.036 | −1.711 |
| 5 | 13.063 | 6.182 | 2.926 | 1.101 | 1.906 |
| 6 | 1.702 | −0.807 | 0.382 | 0.259 | −0.304 |
| SUM | 2.128 | 0.184 | −0.039 | 0.249 | 3.316 |

In the above table, $S_1$ indicates spherical aberrations; $S_2$ coma; $S_3$ astigmatism; P Petzval coefficient; and $S_5$ distortion.

In the above example, as computed from the parameters thereof: $F=+0.2764F$; $F_{1,2}=-1.4608F$; $r_4=0.1032F$; $r_5=0.274F$; and $t_2=0.01455F$.

While there has been described and illustrated a preferred embodiment of the present invention it is apparent that numerous alterations, omissions and additions may be made without departing from the spirit thereof.

What is claimed is:

1. A triplet lens system of focal length F comprising a first positive fluorite lens, a second negative fused silica lens and a third positive fluorite lens and having the following dimensions:

$r_1=0.11347F$  $t_1=0.04409F$
$r_2=1.9693F$  $t_2=0.01455F$
$r_3=-0.53803F$  $t_3=0.00826F$
$r_4=0.1032F$  $t_4=0.07783F$
$r_5=0.274F$  $t_5=0.0324F$
$r_6=1.163665F$ wherein the lens faces are consecutively designated from the front to the rear as the first to the sixth face, $r_1$ is the radius of curvature of the corresponding subscript designated lens face, and $t_1$ is the distance between the subscript designated lens face and the next consecutively rearward lens face.

2. A triplet type lens system comprising three lenses designated consecutively from the front to the rear as the first to the third lens and having faces designated consecutively from the front to the rear as the first to the sixth face, said lens system including a first positive fluorite lens having a forwardly convex front face, a second negative fused silica lens having a forwardly concave front face and a rearwardly concave rear face and a third positive fluorite lens having a forwardly convex front face and a rearwardly convex rear face and possessing the substantially following parameters: $F_1=+0.2764F$; $F_{1,2}=-1.4608F$; $r_4=0.1032F$; $r_5=0.274F$; $t_2=0.01455F$, wherein F is the focal length of the lens system, $F_{1...i}$ is the resultant focal length of the subscript designated lenses, $r_1$ is the radius of curvature of the corresponding subscript designated lens face, and $t_1$ is the distance between the subscript designated lens face and the next consecutively rearward lens face.

References Cited

UNITED STATES PATENTS 2,487,873  11/1949  Herzberger et al. ____ 350—177
3,035,490  5/1962  Tibbetts _____ 350—177 X JOHN K. CORBIN, Primary Examiner U.S. Cl. X.R.

350—177, 266